Nov. 7, 1967    V. E. ROOT    3,350,728
COMBINED POLLEN COLLECTOR AND ENTRANCE
RESTRICTION FOR BEE HIVES
Filed Aug. 16, 1965
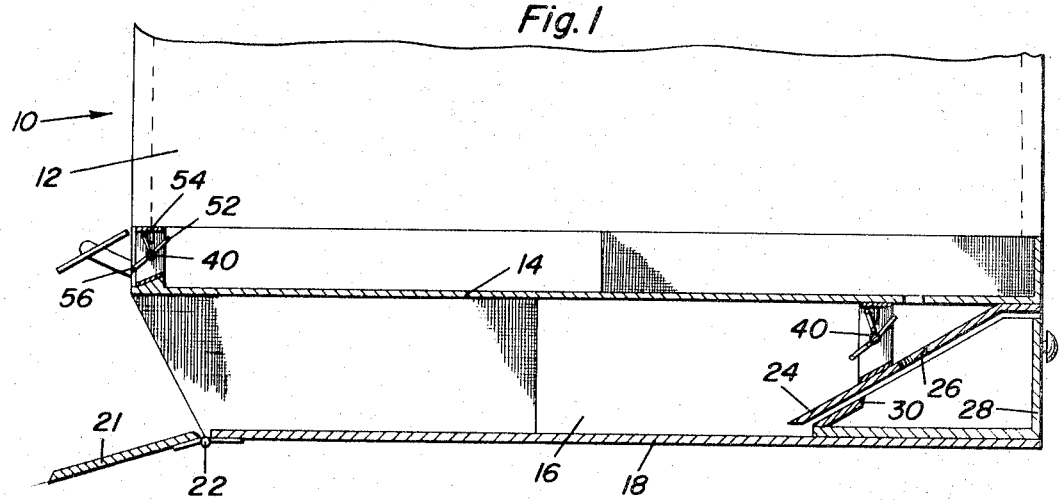
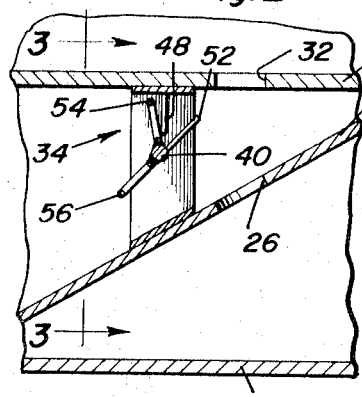
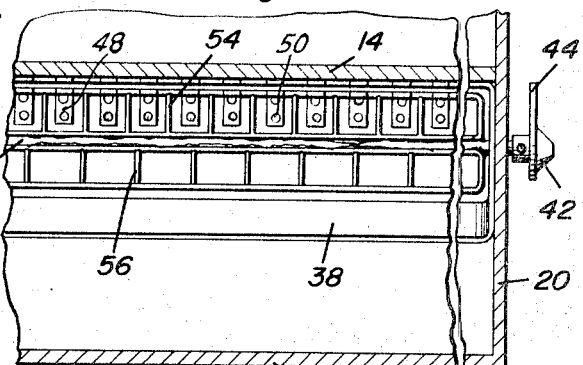
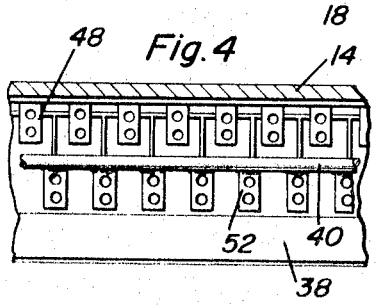
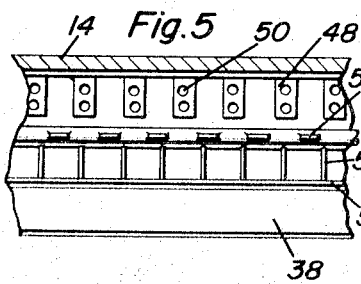
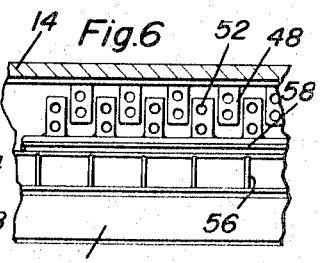
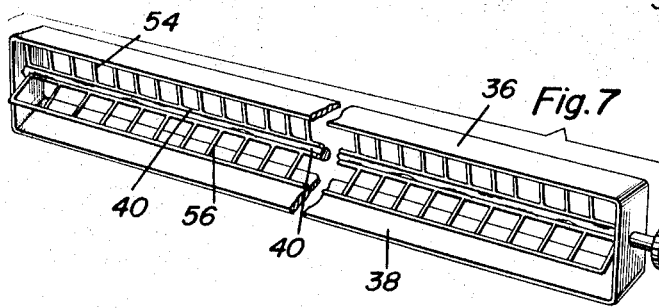
Viotti E. Root
INVENTOR.

United States Patent Office 3,350,728
Patented Nov. 7, 1967

3,350,728
COMBINED POLLEN COLLECTOR AND ENTRANCE RESTRICTION FOR BEE HIVES
Viotti E. Root, Cadis Stage Road, Owego, N.Y. 13827
Filed Aug. 16, 1965, Ser. No. 479,761
8 Claims. (Cl. 6—4)

ABSTRACT OF THE DISCLOSURE

A pollen collecting and entrance restricting structure for bee hives in which a base is provided with an entrance way having means associated therewith for orientation and different positions to provide ventilation for the bee hives and to selectively exclude all bees, provide free access to all bees without restriction, provide access to all bees with restrictions which scrape and remove pollen from the bees as they enter and exclude large size bees such as the drones and queen bee while permitting passage of the smaller bees such as workers. Structurally the device includes a shaft which is rotatable from the exterior of the beehive base having a plurality of circumferentially spaced longitudinal rows of projections thereon for selective positioning in relation to an entrance way and stationary projections disposed in the entrance way. The entrance way has a ramp forming the bottom thereof with the ramp having openings receiving pollen removed from the bees with the pollen being collected in a removable tray.

---

The present invention generally relates to a bee hive structure and more particularly a novel pollen collecting and entrance restriction device for bee hives and the structure disclosed in this application represents certain improvements on my copending U.S. Ser. No. 26,509 filed Mar. 15, 1963 for Traffic Controlled Hive Base now Patent No. 3,200,419 issued Aug. 17, 1965.

An object of the present invention is to provide a bee hive and more particularly a bee hive base having a combined pollen collecting structure and entrance restriction structure incorporating an adjustable component therein which may be orientated in a plurality of predetermined positions for the purpose of selectively preventing ingress and egress of all bees, permitting unobstructed ingress and egress of all bees, and permitting ingress and egress of certain bees while preventing such movement of others by providing a predetermined selected size of openings to exclude certain bees while permitting passage of others.

For example, in one position of the adjustable component, all bees may pass with no restriction. In another position, no bees can pass. In another position, all bees can pass but the pollen baskets on the bees will be removed and deposited in a removable tray or the like. In another position, the worker bees may pass into the bee hive but the queen bee and drones which are larger than the workers cannot pass into the bee hives due to their size. Thus, an additional object of the invention is to provide an entrance opening control device for selectively restricting the size of the passageways forming an entrance to the bee hive to selectively exclude certain bees when desired.

A further object of the present invention is to provide a combined pollen collector and entrance restriction for bee hives having openings therethrough to permit ventilation or air passage in all of its adjusted positions and which may be incorporated into the dark landing area thereof or in the entrance that is used when the bees are not returning to the hives with a load of nectar or pollen.

Still another object of the present invention is to provide a combined pollen collector and entrance restriction for bee hives which may be attached to existing bee hives or incorporated into newly constructed bee hives and which is easy to attach, simple in construction, easy to adjust, long lasting and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a sectional view of a bee hive with the combined pollen collector and entrance restriction incorporated therein;

FIGURE 2 is a fragmental detail sectional view of a portion of the construction of FIGURE 1;

FIGURE 3 is a detailed sectional view illustrating a front elevational fiew of the pollen collecting and entrance restriction device of this invention;

FIGURES 4, 5 and 6 illustrate three positions of the combined pollen collecting and entrance restricting device; and FIGURE 7 is a perspective view of the combined pollen collecting and entrance restricting device illustrating the construction thereof enabling it to be inserted readily into a bee hive with the depending projection omitted.

Referring now to the drawings, there is illustrated in FIGURE 1 a bee hive generally designated by the numeral 10 and including the usual brood chamber 12 which is of conventional construction and forms no particular part of the present invention. The bee hive includes a bottom wall 14 which forms the upper wall for an entranceway or area 16 which is defined by a bottom 18 parallel to the wall 14 and an end wall 20 of any suitable construction. A closure 21 is provided at the forward end of the entranceway 16 and the closure is hingedly attached to the bottom 18 by a hinge 22 for enabling closure of the entranceway when desired.

Disposed within the entranceway adjacent the end thereof remote from the closure 21 is an inclined ramp 24 having a plurality of rows of apertures 26 or other suitable openings therein which may be in the form of slots or individual apertures for permitting passage of pollen into a removable drawer 28 which has an open top 30 underlying the ramp 24 thus collecting pollen or other material discharged through the openings 26.

The bottom wall 14 is provided with a plurality of openings or a slot 32 therein overlying the upper portion of the ramp 24. A pollen collecting and entrance restricting means generally designated by numeral 34 is orientated immediately adjacent to but on the approach side of the openings 32 and 26 and, in effect, forms a closure for the inner end of the entranceway 16 or at least a control for passage of bees therethrough.

The pollen collecting and entrance restricting means 34 includes a generally elongated rectangular frame 36 having an inclined bottom member 38 corresponding with the inclination of the ramp 24 for attachment thereto in any suitable manner. Extending longitudinally between the end walls of the frame 36 is an elongated shaft or rod 40 rotatably journalled on the end walls and provided with a knob 42 on one end thereof which may be removable and provided with a pointer 44 for association with suitable indicia for indicating the position of the rod about its longitudinal axis.

Positioned rigidly on the top wall of the frame 36 is a plurality of depending projections 48 which are spaced apart a distance insufficient to enable passage of any bees. The projections extend to a point adjacent the shaft 40 and the distance between the ends of the projections 48 and the shaft 40 is insufficient to permit passage of bees. The projections 48 are provided with small apertures 50 therein for ventilation purposes thus permitting a maximum passage of air but at all times preventing any bees from entering between the shaft or rod 40 and the top wall of the frame 36.

Mounted on the shaft 40 are three longitudinal rows of projections 52, 54 and 56 which are circumferentially orientated with the projections 52 and 56 being diametrically opposed and the projections 54 extending radially intermediate the projections 52 and 56 and generally in acute angular orientation in relation to the projections 52 although this particular angle may be varied. However, it is necessary that the projections 52 and 56 be diametrically opposed so that when the shaft 40 is in the position illustrated in FIGURE 2, there is free access past the pollen collecting and entrance restricting means 34 inasmuch as there are no projections between the shaft 40 and the bottom member 38 of the frame 36.

Thus, the position illustrated in FIGURES 1 and 2 may be considered a completely open position so that all bees can go in or out. The projections 52 are spaced in such a manner that they can pass between the projections 48 with a very minimum of clearance. The projections 52 may also have apertures therethrough for passage of air when they are orientated in a position in alignment with but below the projections 48 such as is the position illustrated in FIGURE 4 which is considered the closed position inasmuch as the distance between the projections 52 will be substantially the same as the distance between the projections 48 thus excluding the passage of bees between the projections 48 and also excluding the passage of bees between the projections 52. The distance between the bottom edges of the projections 48 and the shaft 40 and the distance between the bottom edges of the projections 52 and the bottom member 38 is insufficient to permit passage of bees. Thus, when the shaft is in the position illustrated in FIGURE 4, no bees can enter or exit and this may be considered the closed position although the apertures and small spaces permit ventilation.

In the position of FIGURE 5, the projections 54 are in alignment with the projections 48 and the projections 52 extend forwardly and the projections 56 extend rearwardly and are not visible. In this position, the size of the openings defined by the projections 54 is sufficient to enable passage of all worker bees but excludes the queen bee and drones. As outlined in my copending application, the dimension of the space between the projections 54 must not exceed .162 or .163 inch in order to exclude the queen bee and drones and this will still enable the workers to have access to the hive. The projections 54 may be in the form of a wire screen or reticulated material, in which the ends thereof are interconnected by a longitudinal member 58 which prevents projections 54 from passing between the projections 48. In the position illustrated in FIGURE 6, the projections 56 are in depending relation and the projections 52 are disposed between the projections 48 and the projections 54 extend forwardly. In this position, the spatial relation between the projections 56 permits entrance of all bees but the projections are so arranged that pollen will be scraped or removed from the bees by the projections 56 and drop through the openings 26.

The bee hive structure itself may be varied as to the materials, size and the like depending upon the particular situation. Also, the same pollen collecting and entrance restricting means may be incorporated into the entranceway in the bottom area of the brood chamber which normally is used when the bees are leaving the hive and is also used when the bees are returning without pollen or nectar. Thus, by combining the two devices, complete control may be provided for access and egress of the bees.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pollen collecting means for use in bee hives comprising a ramp over which bees are compelled to pass during their entrance into a hive, said ramp including opening forming means therein through which pollen is adapted to drop, and means disposed above said ramp through which the bees must pass during their entrance into a hive, said last named means including spaced projections, the spatial relationship of the projections being such that pollen carried by bees entering the hive will be removed by the projections, said projections being disposed adjacent the opening forming means whereby the removed pollen will be discharged by gravity through the opening forming means.

2. The structure as defined in claim 1 wherein said pollen collecting means includes a removable tray underlying said opening forming means for receiving pollen discharged therethrough.

3. The structure as defined in claim 2 wherein said projections are mounted on a shaft extending generally in parallel relation across said ramp, the projections on said shaft being radial and in longitudinal alignment and spaced from each other a distance to brush and scrape pollen from each bee passing therebetween.

4. The structure as defined in claim 3 wherein said shaft is rotatably mounted in overlying relation to the ramp and includes a circumferential area thereon free of projections for orientation above the ramp thus providing selective free access to the bee hive thereby enabling selective collection of pollen from the bees.

5. An entrance restricting means for a bee hive comprising in combination with a bee hive having a transversely extending entrance, a transversely extending shaft disposed across said entrance, means journalling said shaft for pivotal oscillation about its longitudinal axis, and a plurality of projections on said shaft, said projections extending across the entrance and spaced apart a dimension for excluding bees over a certain dimension while permitting entry of smaller bees, the spatial relation between the projections being sufficient to permit the passage of workers but insufficient to permit passage of drones and the queen bee, said projections being orientated in longitudinal mutually spaced alignment in a first row, a second row of projections mounted on said shaft in circumferentially spaced relation to the first row for selective orientation across the entrance, said projections in the second row being spaced apart a distance to exclude all bees when the second row of projections extend across the entrance, third row of projections mounted on said shaft dimensioned to permit entry of all bees when extending across the entrance but arranged to scrape pollen therefrom said shaft including an area void of projections to enable free access to all size bees.

6. The structure as defined in claim 5 wherein said shaft includes manual operating means connected thereto and accessible from the exterior of the hive for pivoting the shaft selectively to a predetermined position for determining the position of the entrance restricting means.

7. A combined pollen collecting and entrance restricting means for a bee hive having an entranceway comprising a plurality of longitudinally spaced and aligned depending projections stationarily mounted in the upper area of said entranceway, a shaft mounted transversely of the entranceway below the projections, said shaft having a plurality of circumferentially spaced rows of projections thereon, a first row of said projections being dimensionally arranged to pass through the stationary projections in close fitting relation thereto and to be orientated in diametrically opposed relation to the stationary projections thereby forming a complete closure for the entranceway with the space between the projections being insufficient to permit passage of bees, a second row of projections on said shaft being dimensionally related to permit passage of all bees but sufficiently small to scrapingly contact the bees for brushing and scraping pollen therefrom, the third row of projections being dimensionally related to permit the passage of bees having a size dimension below a predetermined size and prevent entry of bees having a size dimension above a predetermined size such as drones and the queen bee.

8. The combined pollen collecting and entrance restricting means of claim 7 wherein said entranceway has a bottom surface defined by an inclined ramp, said inclined ramp having means therein forming an opening adjacent the second row of projections when disposed across the entranceway for enabling pollen removed from the bees passing through the second row of projections to discharge through the ramp, and a removable collecting tray disposed under the ramp in alignment with the opening therethrough for collecting pollen discharged through the ramp.

References Cited

UNITED STATES PATENTS

| 507,506 | 10/1893 | Stead | 6—4 |
|---|---|---|---|
| 1,064,779 | 6/1913 | Schamu | 6—4 |

FOREIGN PATENTS

| 163,546 | 7/1949 | Austria. |
| 69,411 | 6/1949 | Denmark. |

LUCIE H. LAUDENSLAGER, *Primary Examiner.*